US010931126B2

(12) United States Patent
Jiang et al.

(10) Patent No.: US 10,931,126 B2
(45) Date of Patent: Feb. 23, 2021

(54) VEHICLE HOLDER

(71) Applicant: SHENZHEN WIRELESS TECHNOLOGY CO., LTD., Guangdong (CN)

(72) Inventors: Yichao Jiang, Guangdong (CN); Minli Yuan, Guangdong (CN); Wei Huang, Guangdong (CN); Xiangyuan Li, Guangdong (CN)

(73) Assignee: Shenzhen Wireless Technology Co., Ltd., Guangdong (CN)

( * ) Notice: Subject to any disclaimer, the term of this patent is extended or adjusted under 35 U.S.C. 154(b) by 155 days.

(21) Appl. No.: 16/096,632

(22) PCT Filed: Jun. 27, 2018

(86) PCT No.: PCT/CN2018/093138
§ 371 (c)(1),
(2) Date: Oct. 25, 2018

(87) PCT Pub. No.: WO2020/000259
PCT Pub. Date: Jan. 2, 2020

(65) Prior Publication Data
US 2020/0006968 A1 Jan. 2, 2020

(51) Int. Cl.
H02J 7/00 (2006.01)
H02J 7/02 (2016.01)
H02J 50/10 (2016.01)
H02J 7/06 (2006.01)
B60R 11/02 (2006.01)
B60R 11/00 (2006.01)

(52) U.S. Cl.
CPC ........ *H02J 7/0044* (2013.01); *B60R 11/0241* (2013.01); *H02J 7/00* (2013.01); *H02J 7/025* (2013.01); *H02J 7/06* (2013.01); *H02J 50/10* (2016.02); *B60R 2011/0003* (2013.01); *B60R 2011/0071* (2013.01); *B60R 2011/0092* (2013.01)

(58) Field of Classification Search
CPC .................................................. H02J 7/0044
USPC ......................................................... 320/115
See application file for complete search history.

(56) References Cited

U.S. PATENT DOCUMENTS

2015/0244201 A1* 8/2015 Chu ........................ H02J 50/40
320/108
2019/0126843 A1* 5/2019 Bouchard ........... B60R 11/0241

* cited by examiner

*Primary Examiner* — Eric D Lee
(74) *Attorney, Agent, or Firm* — Muncy, Geissler, Olds & Lowe, P.C.

(57) ABSTRACT

The present application relates to the technical field of holder, and discloses a vehicle holder. An inductive signal is generated when the wireless charging module and the device to be wirelessly charged match with each other successfully, the first control module generates a motor control signal according to the inductive signal; the motor drive module generates a motor drive signal according to the motor control signal to cause the fixing clamp to clamp tightly. Since an auto-induction fitting and clamping is achieved when the device to be wirelessly charged is matched, a defect that it is impossible to directly detect the approaching and the matching of the device to be wirelessly charged to implement the auto-induction fitting and clamping can be overcome, and the convenience of the vehicle holder is improved.

7 Claims, 3 Drawing Sheets

VEHICLE HOLDER

TECHNICAL FIELD

The present application relates to the technical field of holder, and particularly to a vehicle holder.

BACKGROUND

A traditional vehicle holder for mobile phone comprises a fixing clamp used for clamping and driving through a motor, this fixing clamp is provided with a built-in automatic detection system, the automatic detection system uses a MCU as a main control element and uses an infrared detection sensor as a detection element, the infrared detection sensor is used for performing detection when the mobile phone device is placed in the fixing clamp, and transmitting a detection signal to the MCU, an output end of the MCU drives and controls a motor to cause the fixing clamp to clamp tightly through a motor drive circuit, thereby completing fitting and clamping of the mobile phone in the fixing clamp. The mobile phone holder further includes a touch key circuit and a wireless charging system. Since the infrared detection sensor is used as a detection element, an identification may still be performed mistakenly even if an object other than the mobile phone is close to the mobile phone holder, the situation that the fixing clamp tightly clamps due to unexpected movements of children or approaching of other objects cannot be avoided, and a safety accident is prone to occur in the driving process of the vehicle.

Therefore, the traditional vehicle holder has defect that it can't directly detect the approaching and the matching of the device to be wirelessly charged to achieve auto-induction fitting and clamping.

SUMMARY

The present application provides a vehicle holder which aims at solving a problem that the traditional vehicle holder can't directly detect the approaching and the matching of the device to be wirelessly charged to achieve auto-induction fitting and clamping.

The present application is implemented like this: a vehicle holder, comprising:

a wireless charging module configured to generate an inductive signal when matching with a device to be wirelessly charged:

a first control module connected with the wireless charging module and configured to generate a motor control signal according to the inductive signal; and a motor drive module connected with the first control module and configured to generate a motor drive signal according to the motor control signal to cause a fixing clamp to clamp tightly.

Further, the wireless charging module comprises:

a wireless charging transmission module configured to generate a voltage detection signal and a current detection signal when matching with the device to be wirelessly charged;

a decoding module connected with the wireless charging transmission module and configured to generate a voltage code value signal according to the voltage detection signal, and generate a current code value signal according to the current detection signal; and a second control module connected with the decoding module and the wireless charging transmission module and configured to determine whether the vehicle holder matches with the device to be wirelessly charged successfully or not according to the voltage code value signal and/or the current code value signal, and generate the inductive signal in the case that the vehicle holder matches with the device to be wirelessly charged.

Furthermore, the vehicle holder further comprises:

a first indication module connected with the second control module and configured to perform indication according to the inductive signal.

Furthermore, the second control module comprises a wireless charging chip, a first crystal oscillator, a fourth capacitor and a fifth capacitor;

both a digital power supply terminal and an analog power supply terminal of the wireless charging chip are connected to a first power supply, a first crystal oscillator terminal of the wireless charging chip and a first end of the first crystal oscillator are connected with a first end of a fifth capacitor, a second crystal oscillator terminal of the wireless charging chip and a second end of the first crystal oscillator are connected with a first end of the fourth capacitor, a first data input and output end of the wireless charging chip is a voltage code value signal input end of the second control module, a second data input and output end and a third data input and output end of the wireless charging chip together form a current code value signal input end of the second control module, a first PWM signal output end and the second PWM signal output end of the wireless charging chip together form a charging control signal output end of the second control module, a single bus slave terminal of the wireless charging chip is an inductive signal output end of the second control module, a digital grounding terminal of the wireless charging chip is connected with a power ground.

Furthermore, the decoding module comprises an operational amplifier, a diode, a sixth capacitor, a thirteenth capacitor, a fourteenth capacitor, a fifteenth capacitor, a sixteenth capacitor, a seventeenth capacitor, an eighteenth capacitor, a nineteenth capacitor, a twentieth capacitor, a twenty-first capacitor, a twenty-second capacitor, a third resistor, a fourth resistor, a fifth resistor, a sixth resistor, a seventh resistor, an eighth resistor, a ninth resistor, a tenth resistor, an eleventh resistor, a twelfth resistor and a thirteenth resistor, a fourteenth resistor, a fifteenth resistor, a sixteenth resistor, a seventeenth resistor, an eighteenth resistor, a nineteenth resistor, a twentieth resistor and a twenty-first resistor;

a first output end of the operational amplifier is connected with a first end of the third resistor and a first end of the fourth resistor, a second end of the third resistor is connected with a first end of the thirteenth capacitor, a first end of the eleventh resistor, a first end of the twelfth resistor and a first end of the thirteenth resistor, a first inverting input end of the operational amplifier is connected with a second end of the fourth resistor and a first end of the fifth resistor, a second end of the fifth resistor is connected with a first end of the fourteenth capacitor, a first positive phase input end of the operational amplifier is connected with a first end of the ninth resistor and a first end of the seventeenth capacitor, a second end of the ninth resistor is connected with a first end of the sixth resistor, a first end of the sixth capacitor and a first end of the tenth resistor, a second end of the sixth resistor and a power supply terminal of the operational amplifier are connected to a third power supply together, both a second end of the sixth capacitor and a first end of the eighth resistor are connected with a first end of the sixteenth capacitor, a second end of the eighth resistor is connected with a first end of the fifteenth capacitor, a first end of the seventh resistor and a negative electrode of the diode, a positive electrode of the diode is the voltage detection signal input end of the decoding module, a second positive phase input end of the operational amplifier is connected with a second end of the eleventh resistor, and a second inverting input end of the operational amplifier is connected with a second end of the thirteenth resistor, a first end of the fifteenth resistor and a first end of the eighteenth capacitor, a second end of the twelfth resistor, a first end of the fourteenth resistor and a second output end of the operational amplifier together form a voltage decoding signal output end of the decoding module, a third output end of the operational amplifier is connected with a first end of the sixteenth resistor, a first end of the twentieth resistor, a first end of the seventeenth resistor and a first end of the eighteenth resistor, a second end of the sixteenth resistor and a first end of the twenty-first capacitor together form a first current code value signal output end of the decoding module, a fourth output end of the operational amplifier forms a second current code value signal output end of the decoding module, a second end of the twentieth resistor is connected with a third inverting input end of the operational amplifier and a first end of the nineteenth resistor, a third positive phase input end of the operational amplifier is connected with a first end of the twenty-first resistor and a first end of the twenty-second capacitor, a second end of the twenty-first resistor is a current detection signal input end of the decoding module, a fourth positive phase input end of the operational amplifier is connected with a second end of the eighteenth resistor and a first end of the twenty capacitor, a fourth inverting input end of the operational amplifier is connected with a second end of the seventeenth resistor and a first end of the nineteenth capacitor;

a second end of the thirteenth capacitor, a second end of the fourteenth capacitor, a second end of the fifteenth capacitor, a second end of the sixteenth capacitor, a second end of the seventeenth capacitor, a second end of the eighteenth capacitor, a second end of the nineteenth capacitor, a second end of the nineteenth capacitor, a second end of the twenty capacitor, a second end of the twenty-first capacitor, a second end of the twenty-second capacitor, a second end of the seventh resistor, a second end of the tenth resistor, a second end of the fourteenth resistor, a second end of the fifteenth resistor and a second end of the nineteenth resistor are connected to a power ground together.

Furthermore, the vehicle holder further comprises:
a key module connected with the first control module and configured to generate a key signal according to a user input;
the first control module is further configured to generate the motor control signal according to the key signal.

Furthermore, the vehicle holder further comprises:
a position switch module connected with the first control module and configured to generate a position detection signal according to the state of the fixing clamp;
the first control module is further configured to generate the motor control signal according to the position detection signal.

Furthermore, the vehicle holder further comprises:
a second indication module connected with the first control module and configured to perform indication according to the indication signal:
the first control module is further configured to generate the indication signal when the motor control signal is generated.

Furthermore, the first control module comprises a microprocessor, a second crystal oscillator, a ninth capacitor, a tenth capacitor, a twelfth capacitor, a first resistor and a second resistor;

a power supply terminal of the microprocessor is connected with the second power supply, a first crystal oscillator terminal of the microprocessor is connected with a first end of the second crystal oscillator and a first end of the ninth capacitor, a second crystal oscillator terminal of the microprocessor is connected with a second end of the second crystal oscillator and a first end of the tenth capacitor, a first data input and output end of the microprocessor is an induction signal input end of the first control module, a second data input and output end of the microprocessor and a first end of the first resistor together form a key signal input end of the first control module, a third data input and output end of the microprocessor is connected with a second end of the first resistor and a first end of the second resistor, a second end of the second resistor and a first end of the twelfth capacitor together form a position detection signal input end of the first control module, a fourth data input and output end of the microprocessor is an indication signal output end of the first control module, a fifth data input and output end, a sixth data input output end and a seventh data input and output end of the microprocessor together form a motor control signal output end of the first control module, a second end of the ninth capacitor, a second end of the tenth capacitor, a second end of the twelfth capacitor and a ground terminal of the microprocessor are connected with a power ground.

According to embodiments of the present application, the wireless charging module generates the inductive signal when matching with the device to be wirelessly charged; the first control module generates the motor control signal according to the inductive signal; the motor drive module generates the motor drive signal according to the motor control signal so as to cause the fixing clamp to clamp tightly. Since an auto-induction fitting and clamping is realized when the device to be wirelessly charged is matched, the defect that it is impossible to directly detect the approaching and the matching of the device to be wirelessly charged to implement auto-induction fitting and clamping can be overcome, and the convenience of the vehicle holder is improved.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described in the following are only some embodiments of the present application, for the ordinarily skilled one in the art, other drawings can also be obtained according to the current drawings on the premise of paying no creative labor.

EMBODIMENTS OF THE PRESENT APPLICATION

In order to make the purpose, the technical solution and the advantageous effects of the present application be clearer, the embodiments of the present application will be further described in detail with reference to accompanying figures.

Figure 1:
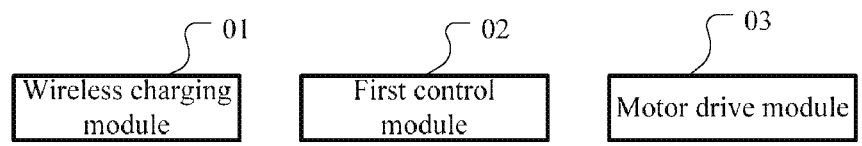
FIG. 1 illustrates a modular structural diagram of a vehicle holder provided by an embodiment of the present application.

FIG. 1 illustrates a modular structure of a vehicle holder provided by an embodiment of the present application, for convenient explanation, only the part that is relevant to the embodiment of the present application is illustrated, and is described as follows:

the aforesaid vehicle holder includes a wireless charging module 01, a first control module 02 and a motor drive module 03.

The wireless charging module 01 is configured to generate an inductive signal when matching with a device to be wirelessly charged; the first control module 02 is connected with the wireless charging module 01 and is configured to generate a motor control signal according to the inductive signal; the motor drive module 03 is connected with the first control module 02 and is configured to generate a motor drive signal according to the motor control signal to clamp a fixing clamp tightly.

The wireless charging module 01 is configured to generate inductive signal when matching with the device to be wirelessly charged particularly includes three conditions as follows:

A, the wireless charging module 01 is configured to generate the inductive signal according to communication connection with the device to be wirelessly charged. The communication connection can be a successful handshaking according to wireless charging protocol communication.

B, the wireless charging module 01 is configured to generate an induction signal according to the change of charging current or charging voltage when matching with the device to be wirelessly charged.

C, the wireless charging module 01 is configured to generate an inductive signal according to the change of waveform or frequency of the charging voltage when matching with the device to be wirelessly charged.

Figure 2:
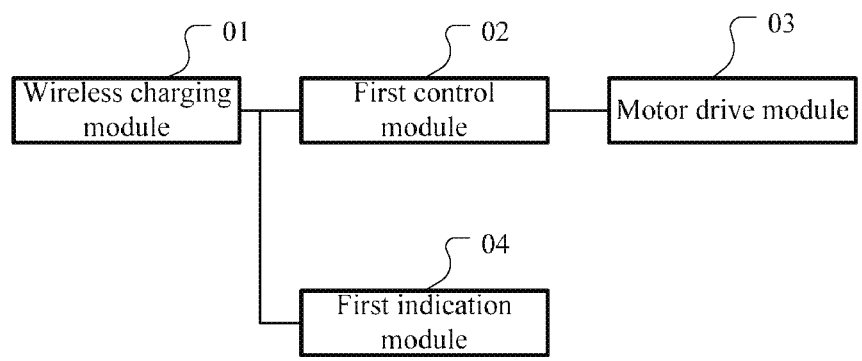
FIG. 2 illustrates another modular structural diagram of a vehicle holder provided by an embodiment of the present application.

As shown in FIG. 2, the vehicle holder further includes a first indication module 04.

The first indication module 04 is connected with the second control module 013 and is configured to perform indication according to the sensing signal.

Figure 3:
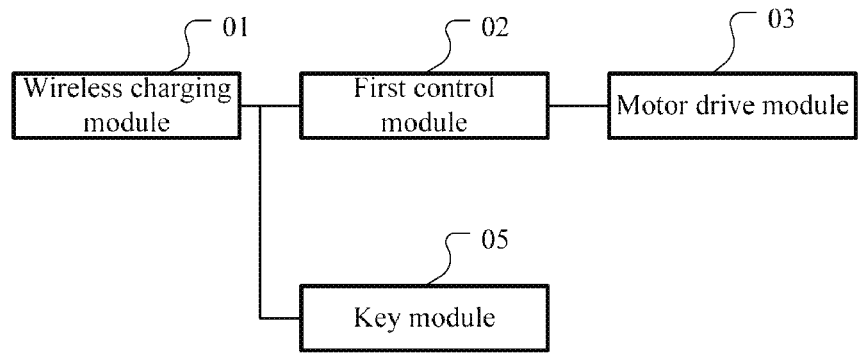
FIG. 3 illustrates another modular structural diagram of a vehicle holder provided by an embodiment of the present application.

As shown in FIG. 3, the vehicle holder further includes a key module 05.

The key module 05 is connected with the first control module 02 and is configured to generate a key signal according to user input.

The first control module 02 is further configured to generate a motor control signal according to the key signal.

Figure 4:
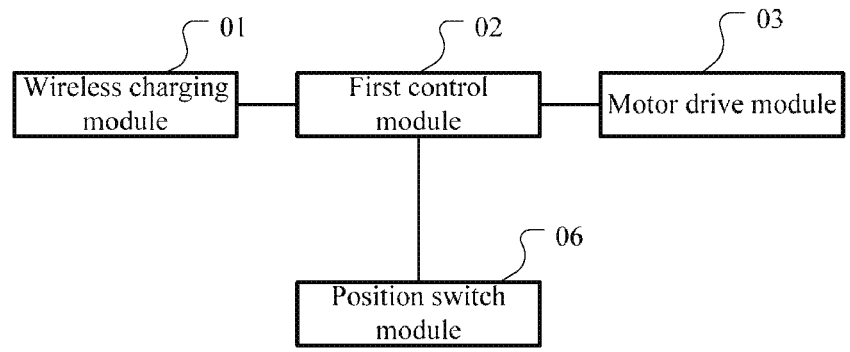
FIG. 4 illustrates another modular structural diagram of a vehicle holder provided by an embodiment of the present application.

As shown in FIG. 4, the vehicle holder further includes a position switch module 06.

The position switch module 06 is connected with the first control module 02 and is configured to generate a position detection signal according to the state of the fixing clamp.

The first control module 02 is further configured to generate a motor control signal according to the position detection signal.

Figure 5:
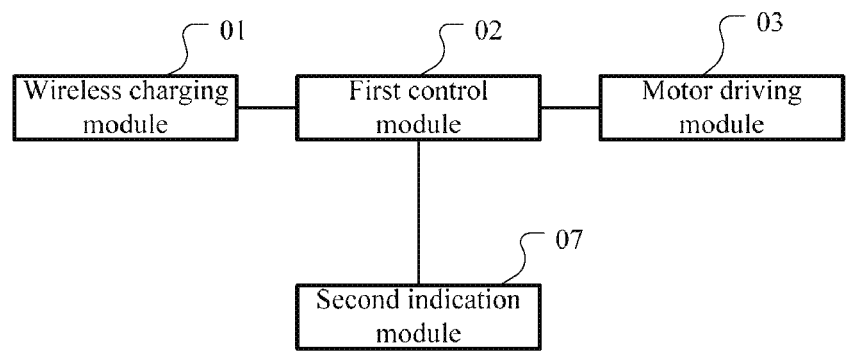
FIG. 5 illustrates another modular structural diagram of a vehicle holder provided by an embodiment of the present application.

As shown in FIG. 5, the vehicle holder further includes a second indication module 07 which is connected with the first control module 02 and is configured to perform indication according to indication signal.

The first control module 02 is further configured to generate the indication signal when generating a motor control signal.

Figure 6:
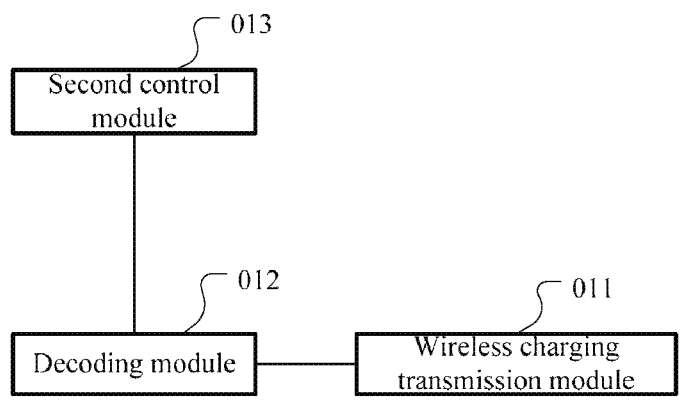
FIG. 6 illustrates a modular structural diagram of a wireless charging module of the vehicle holder provided by an embodiment of the present application.

As shown in FIG. 6, the wireless charging module 01 includes a wireless charging transmission module 011, a decoding module 012 and a second control module 013.

The wireless charging transmission module 011 is configured to generate a voltage detection signal and a current detection signal when matching with the device to be wirelessly charged.

The decoding module 012 is connected with the wireless charging transmission module 011 and is configured to generate a voltage code value signal according to the voltage detection signal, and generate a current code value signal according to the current detection signal.

The second control module 013 is connected with the decoding module 012 and the wireless charging transmission module 011 and is configured to determine whether the vehicle holder matches with the device to be wirelessly charged successfully or not according to the voltage code value signal and/or the current code value signal, and generate an inductive signal in the case that the vehicle holder matches with the device to be wirelessly charged.

The second control module 013 is further configured to generate a charging control signal according to the voltage code value signal and/or the current code value signal, the wireless charging transmission module 11 is further configured to convert electric energy into electromagnetic energy according to the charging control signal.

Figure 7:
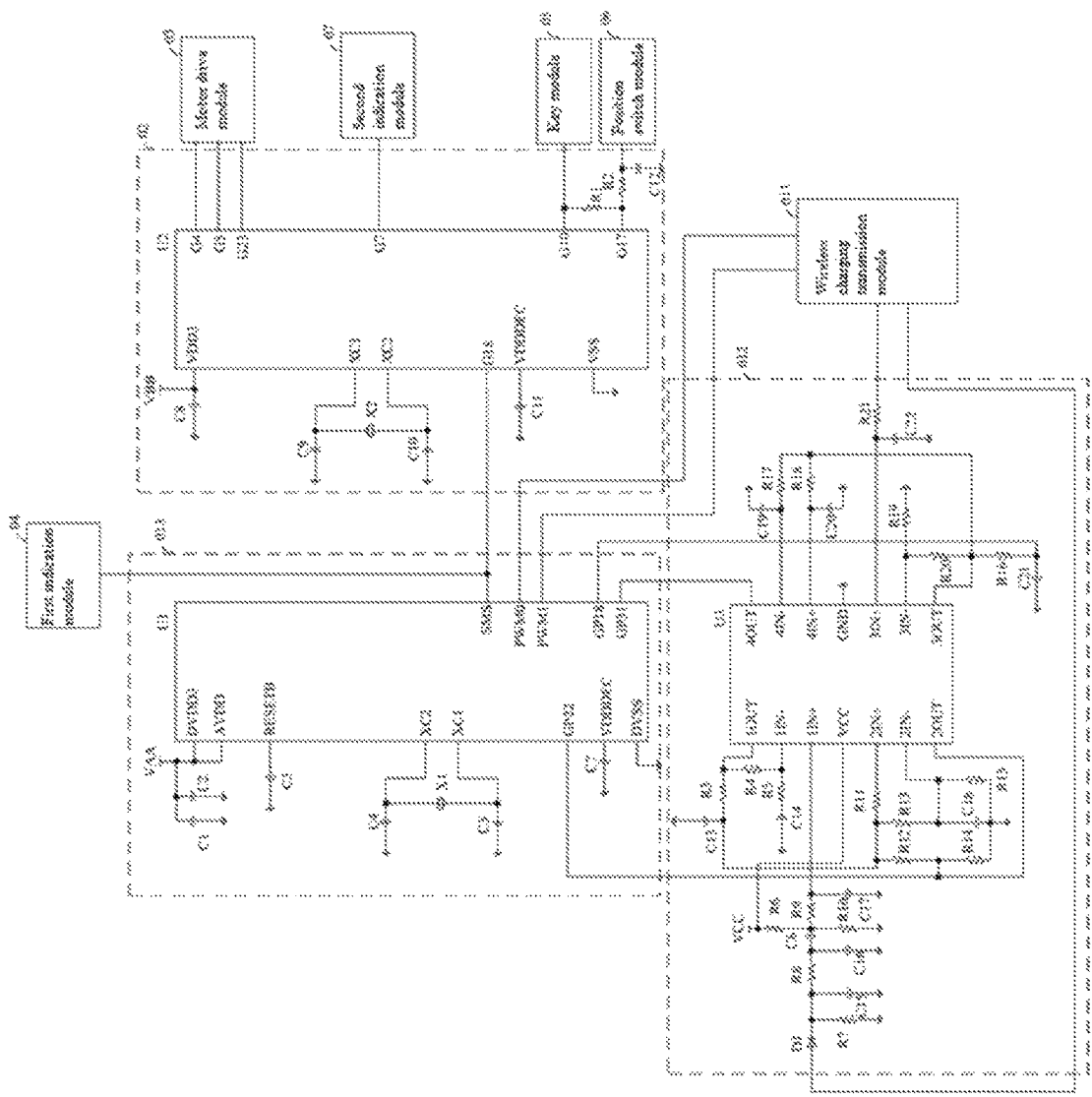
FIG. 7 illustrates an exemplary circuit diagram of the vehicle holder provided by an embodiment of the present application.

FIG. 7 shows an exemplary circuit structure of the vehicle holder provided by an embodiment of the present application, in order to describe conveniently, only the part that is relevant to the embodiments of the present application is shown, and is described in detail as follows:

the second control module 013 includes a wireless charging chip U1, a first crystal oscillator X1, a fourth capacitor C4 and a fifth capacitor C5;

both a digital power supply terminal DVDD3 and an analog power supply terminal AVDD of the wireless charging chip U1 are connected to a first power supply VAA, a first crystal oscillator terminal XC1 of the wireless charging chip U1 and a first end of the first crystal oscillator X1 are connected with a first end of a fifth capacitor C5, a second crystal oscillator terminal XC2 of the wireless charging chip U1 and a second end of the first crystal oscillator X1 are connected with a first end of the fourth capacitor C4, a first data input and output end GP22 of the wireless charging chip U1 is a voltage code value signal input end of the second control module 013, a second data input and output end GP31 and a third data input and output end GP18 of the wireless charging chip U1 together form a current code value signal input end of the second control module 013, a first PWM signal output end PWM0 and the second PWM signal output end PWM1 of the wireless charging chip U1 together form a charging control signal output end of the second control module 013, a single bus slave terminal SWS of the wireless charging chip U1 is an inductive signal output end of the second control module 013, a digital grounding terminal DVSS of the wireless charging chip U1 is connected with a power ground.

The second control module 013 further includes a first capacitor C1 and a second capacitor C2, a third capacitor C3 and a seventh capacitor C7.

Both a first end of the first capacitor C1 and a first end of the second capacitor C2 are connected to a first power source VAA, a first end of the third capacitor C3 is connected with a reset end RESETB of the wireless charging chip U1, a first end of the seventh capacitor C7 is connected with the output end VDDDEC of the power supply LDO of the wireless charging chip U1, a second end of the first capacitor C1, a second end of the second capacitor C2, a second end of the third capacitor C3 and a second end of the seventh capacitor C7 are connected to the power ground together.

The decoding module 012 includes an operational amplifier U3, a diode DI, a sixth capacitor C6, a thirteenth capacitor C13, a fourteenth capacitor C14, a fifteenth capacitor C15, a sixteenth capacitor C16, a seventeenth capacitor C17, an eighteenth capacitor C18, a nineteenth capacitor C19, a twentieth capacitor C20, a twenty-first capacitor C21, a twenty-second capacitor C22, a third resistor R3, a fourth resistor R4, a fifth resistor R5, a sixth resistor R6, a seventh resistor R7, an eighth resistor R8, a ninth resistor R9, a tenth resistor R10, an eleventh resistor R11, a twelfth resistor R12 and a thirteenth resistor R13, a fourteenth resistor R14, a fifteenth resistor R15, a sixteenth resistor R16, a seventeenth resistor R17, an eighteenth resistor R18, a nineteenth resistor R19, a twentieth resistor R20 and a twenty-first resistor R21;

a first output end 1OUT of the operational amplifier U3 is connected with a first end of the third resistor R3 and a first end of the fourth resistor R4, a second end of the third resistor R3 is connected with a first end of the thirteenth capacitor C13, a first end of the eleventh resistor R11, a first end of the twelfth resistor R12 and a first end of the thirteenth resistor R13, a first inverting input end 1 IN of the operational amplifier U3 is connected with a second end of the fourth resistor R4 and a first end of the fifth resistor R5, a second end of the fifth resistor R5 is connected with a first end of the fourteenth capacitor C14, a first positive phase input end 1IN+ of the operational amplifier U3 is connected with a first end of the ninth resistor R9 and a first end of the seventeenth capacitor C17, a second end of the ninth resistor R9 is connected with a first end of the sixth resistor R6, a first end of the sixth capacitor C6 and a first end of the tenth resistor R10, a second end of the sixth resistor R6 and a power supply terminal VCC of the operational amplifier U3 are connected to a third power supply VCC together, both a second end of the sixth capacitor C6 and a first end of the eighth resistor R8 are connected with a first end of the sixteenth capacitor C16, a second end of the eighth resistor R8 is connected with a first end of the fifteenth capacitor C15, a first end of the seventh resistor R7 and a negative electrode of the diode DI, a positive electrode of the diode DI is the voltage detection signal input end of the decoding module 012, a second positive phase input end 2IN+ of the operational amplifier U1 is connected with a second end of the eleventh resistor R11, and a second inverting input end 2IN− of the operational amplifier U3 is connected with a second end of the thirteenth resistor R13, a first end of the fifteenth resistor R15 and a first end of the eighteenth capacitor C18, a second end of the twelfth resistor R12, a first end of the fourteenth resistor R14 and a second output end of the operational amplifier U3 together form a voltage decoding signal output end of the decoding module 012, a third output end 3OUT of the operational amplifier U3 is connected with a first end of the sixteenth resistor R16, a first end of the twentieth resistor R20, a first end of the seventeenth resistor R17 and a first end of the eighteenth resistor R18, a second end of the sixteenth resistor R16 and a first end of the twenty-first capacitor C21 together form a first current code value signal output end of the decoding module 012, a fourth output end 4OUT of the operational amplifier U3 forms a second current code value signal output end of the decoding module 012, a second end of the twentieth resistor R20 is connected with a third inverting input end 3IN− of the operational amplifier U3 and a first end of the nineteenth resistor R19, a third positive phase input end 3IN+ of the operational amplifier U3 is connected with a first end of the twenty-first resistor R21 and a first end of the twenty-second capacitor C22, a second end of the twenty-first resistor R21 is a current detection signal input end of the decoding module 012, a fourth positive phase input end 4IN+ of the operational amplifier U3 is connected with a second end of the eighteenth resistor R18 and a first end of the twenty capacitor C20, a fourth inverting input end 4IN− of the operational amplifier U3 is connected with a second end of the seventeenth resistor R17 and a first end of the nineteenth capacitor C19.

Wherein the current code value signal includes a first current code value signal and a second current code value signal, by double modulating the current detection signal, a mal-operation which is caused by an error code of the current code value signal can be avoided, and a reliability of the vehicle holder is improved.

A second end of the thirteenth capacitor C13, a second end of the fourteenth capacitor C14, a second end of the fifteenth capacitor C15, a second end of the sixteenth capacitor C16, a second end of the seventeenth capacitor C17, a second end of the eighteenth capacitor C18, a second end of the nineteenth capacitor C19, a second end of the twenty capacitor C20, a second end of the twenty-first capacitor C21, a second end of the twenty-second capacitor C22, a second end of the seventh resistor R7, a second end of the tenth resistor R10, a second end of the fourteenth resistor R14, a second end of the fifteenth resistor R15 and a second end of the nineteenth resistor R19 are connected to a power ground together.

The first control module 02 includes a microprocessor U2, a second crystal oscillator X2, a ninth capacitor C9, a tenth capacitor C10, a twelfth capacitor C12, a first resistor R1 and a second resistor R2;

a power supply terminal VDD3 of the microprocessor U2 is connected with the second power supply VBB, a first crystal oscillator terminal XC1 of the microprocessor U2 is connected with a first end of the second crystal oscillator X2 and a first end of the ninth capacitor C9, a second crystal oscillator terminal XC2 of the microprocessor U2 is connected with a second end of the second crystal oscillator X2 and a first end of the tenth capacitor C10, a first data input and output end G18 of the microprocessor U2 is an induction signal input end of the first control module 02, a second data input and output end G10 of the microprocessor U2 and a first end of the first resistor R1 together form a key signal input end of the first control module 02, a third data input and output end G17 of the microprocessor U2 is connected with a second end of the first resistor R1 and a first end of the second resistor R2, a second end of the second resistor R2 and a first end of the twelfth capacitor C12 together form a position detection signal input end of the first control module 02, a fourth data input and output end G7 of the microprocessor U2 is an indication signal output end of the first control module 02, a fifth data input and output end G4, a sixth data input output end G5 and a seventh data input and output end G23 of the microprocessor U2 together form a motor control signal output end of the first control module 02, a second end of the ninth capacitor C9, a second end of the tenth capacitor C10, a second end of the twelfth capacitor C12 and a ground terminal VSS of the microprocessor U2 are connected with a power ground.

The first control module 02 further includes an eighth capacitor C8 and an eleventh capacitor C11.

A first end of the eighth capacitor C8 is connected with a second power source VBB, a power supply generation terminal VDDDEC of LDO (Linear Dropout Regulator) of the microprocessor U2 is connected with a first end of the eleventh capacitor C11, a second end of the eighth capacitor C8 and a second end of the eleventh capacitor C11 are connected to the power ground together.

The exemplary circuit diagram of the vehicle holder shown in FIG. 7 is further described with reference to the operation principle below:

In the specific implementation process, when the wireless charging transmission module 011 is matched with the device to be wirelessly charged, the wireless charging transmission module 011 generates the voltage detection signal and the current detection signal, the first positive phase input end 1IN+ of the operational amplifier U3 receives the voltage detection signal, and the third positive phase input end 3IN+ of the operational amplifier U3 receives the current detection signal, the operational amplifier U3 generates the voltage code value signal according to the voltage detection signal and generates the current code value signal according to the current detection signal. The voltage code value signal is output from the second output end 2OUT of the operational amplifier U3 to the first data input and output end GP22 of the wireless charging chip U1, and the current code value signal is output from the third output end 3OUT and the fourth output end 3OUT 4OUT of the operational amplifier U3 to the second data input and output end GP31 and the third data input and output end GP18 of the wireless charging chip U1, the wireless charging chip U1 determines whether the device to be wirelessly charged is matched successfully according to the voltage code value signal and/or the current code value signal, generate the inductive signal if the device to be wirelessly charged is matched successfully, and send the inductive signal to the first data input and output end G18 of the microprocessor U2 through the single bus slave terminal SWS of the wireless charging chip U1; the microprocessor U2 generates the motor control signal according to the inductive signal and outputs the motor control signal from the fifth data input end G4 and the sixth data input and output end G5 of the microprocessor U2 to the motor drive module 03; the motor drive signal is generated according to the motor control signal, which makes the fixing clamp to be clamped tightly.

According to embodiments of the present application, the wireless charging module generates the inductive signal when matching with the device to be wirelessly charged; the first control module generates the motor control signal according to the inductive signal; the motor drive module generates the motor drive signal according to the motor control signal to caused the fixing clamp to clamp tightly. Since an auto-induction fitting and clamping is realized when the device to be wirelessly charged is matched, the defect that it is impossible to directly detect the approaching and the matching of the device to be wirelessly charged to implement auto-induction fitting and clamping can be overcome, and the convenience of the vehicle holder is improved.

The aforementioned embodiments are only preferred embodiments of the present application, and should not be regarded as being limitation to the present application. Any modification, equivalent replacement, improvement, and so on, which are made within the spirit and the principle of the present application, should be included in the protection scope of the present application.

What is claimed is:

1. A vehicle holder, comprising:
   a wireless charging module configured to generate an inductive signal when matching with a device to be wirelessly charged;
   a first control module connected with the wireless charging module and configured to generate a motor control signal according to the inductive signal; and
   a motor drive module connected with the first control module and configured to generate a motor drive signal according to the motor control signal so as to cause a fixing clamp to clamp,
   wherein the wireless charging module comprises:
      a wireless charging transmission module configured to generate a voltage detection signal and a current detection signal when matching with the device to be wirelessly charged;
      a decoding module connected with the wireless charging transmission module and configured to generate a voltage code value signal according to the voltage detection signal, and generate a current code value signal according to the current detection signal; and
      a second control module connected with the decoding module and the wireless charging transmission module and configured to determine whether the vehicle holder matches with the device to be wirelessly charged or not according to the voltage code value signal and/or the current code value signal, and generate the inductive signal in the case that the vehicle holder matches with the device to be wirelessly charged,
   wherein the first control module comprises an eighth capacitor, a ninth capacitor, a tenth capacitor, an eleventh capacitor and a twelfth capacitor, the second control module comprises a wireless charging chip, a first crystal oscillator, a first capacitor, a second capacitor, a third capacitor, a fourth capacitor and a fifth capacitor, and a seventh capacitor, and
   wherein both a digital power supply terminal and an analog power supply terminal of the wireless charging chip are connected to a first power supply, a first crystal oscillator terminal of the wireless charging chip and a first end of the first crystal oscillator are connected with a first end of the fifth capacitor, a second crystal oscillator terminal of the wireless charging chip and a second end of the first crystal oscillator are connected with a first end of the fourth capacitor, a first data input and output end of the wireless charging chip is a voltage code value signal input end of the second control module, a second data input and output end and a third data input and output end of the wireless charging chip together form a current code value signal input end of the second control module, a first PWM signal output end and a second PWM signal output end of the wireless charging chip together form a charging control signal output end of the second control module, a single bus slave terminal of the wireless charging chip is an inductive signal output end of the second control module, and a digital grounding terminal of the wireless charging chip is connected with a power ground.

2. The vehicle holder according to claim 1, further comprising:
   a first indication module connected with the second control module and configured to perform indication according to the inductive signal.

3. The vehicle holder according to claim 1, wherein the decoding module comprises an operational amplifier, a diode, a sixth capacitor, a thirteenth capacitor, a fourteenth capacitor, a fifteenth capacitor, a sixteenth capacitor, a seventeenth capacitor, an eighteenth capacitor, a nineteenth capacitor, a twentieth capacitor, a twenty-first capacitor, a twenty-second capacitor, a third resistor, a fourth resistor, a fifth resistor, a sixth resistor, a seventh resistor, an eighth resistor, a ninth resistor, a tenth resistor, an eleventh resistor, a twelfth resistor and a thirteenth resistor, a fourteenth resistor, a fifteenth resistor, a sixteenth resistor, a seventeenth resistor, an eighteenth resistor, a nineteenth resistor, a twentieth resistor and a twenty-first resistor;
   a first output end of the operational amplifier is connected with a first end of the third resistor and a first end of the fourth resistor, a second end of the third resistor is connected with a first end of the thirteenth capacitor, a first end of the eleventh resistor, a first end of the twelfth resistor and a first end of the thirteenth resistor, a first inverting input end of the operational amplifier is connected with a second end of the fourth resistor and a first end of the fifth resistor, a second end of the fifth resistor is connected with a first end of the fourteenth capacitor, a first positive phase input end of the operational amplifier is connected with a first end of the ninth resistor and a first end of the seventeenth capacitor, a second end of the ninth resistor is connected with a first end of the sixth resistor, a first end of the sixth capacitor and a first end of the tenth resistor, a second end of the sixth resistor and a power supply terminal of the operational amplifier are connected to a third power supply together, both a second end of the sixth capacitor and a first end of the eighth resistor are connected with a first end of the sixteenth capacitor, a second end of the eighth resistor is connected with a first end of the fifteenth capacitor, a first end of the seventh resistor and a negative electrode of the diode, a positive electrode of the diode is the voltage detection signal input end of the decoding module, a second positive phase input end of the operational amplifier is connected with a second end of the eleventh resistor, and a second inverting input end of the operational amplifier is connected with a second end of the thirteenth resistor, a first end of the fifteenth resistor and a first end of the eighteenth capacitor, a second end of the twelfth resistor, a first end of the fourteenth resistor and a second output end of the operational amplifier together form a voltage decoding signal output end of the decoding module, a third output end of the operational amplifier is connected with a first end of the sixteenth resistor, a first end of the twentieth resistor, a first end of the seventeenth resistor and a first end of the eighteenth resistor, a second end of the sixteenth resistor and a first end of the twenty-first capacitor together form a first current code value signal output end of the decoding module, a fourth output end of the operational amplifier forms a second current code value signal output end of the decoding module, a second end of the twentieth resistor is connected with a third inverting input end of the operational amplifier and a first end of the nineteenth resistor, a third positive phase input end of the operational amplifier is connected with a first end of the twenty-first resistor and a first end of the twenty-second capacitor, a second end of the twenty-first resistor is a current detection signal input end of the decoding module, a fourth positive phase input end of the operational amplifier is connected with a second end of the eighteenth resistor and a first end of the twenty capacitor, a fourth inverting input end of the operational amplifier is connected with a second end of the seventeenth resistor and a first end of the nineteenth capacitor;
   a second end of the thirteenth capacitor, a second end of the fourteenth capacitor, a second end of the fifteenth capacitor, a second end of the sixteenth capacitor, a second end of the seventeenth capacitor, a second end of the eighteenth capacitor, a second end of the nineteenth capacitor, a second end of the nineteenth capacitor, a second end of the twentieth capacitor, a second end of the twenty-first capacitor, a second end of the twenty-second capacitor, a second end of the seventh resistor, a second end of the tenth resistor, a second end of the fourteenth resistor, and a second end of the fifteenth resistor and a second end of the nineteenth resistor are connected to a power ground together.

4. The vehicle holder according to claim 1, further comprising:
   a key module connected with the first control module and configured to generate a key signal according to a user input;
   wherein the first control module is further configured to generate the motor control signal according to the key signal.

5. The vehicle holder according to claim 1, further comprising:
   a position switch module connected with the first control module and configured to generate a position detection signal according to the state of the fixing clamp;
   wherein the first control module is further configured to generate the motor control signal according to the position detection signal.

6. The vehicle holder according to claim 1, further comprising:
   a second indication module connected with the first control module and configured to perform an indication according to an indication signal;
   wherein the first control module is further configured to generate the indication signal when the motor control signal is generated.

7. The vehicle holder according to claim 1, wherein the first control module further comprises a microprocessor, a second crystal oscillator, a first resistor and a second resistor;
   a power supply terminal of the microprocessor is connected with thea second power supply, a first crystal oscillator terminal of the microprocessor is connected with a first end of the second crystal oscillator and a first end of the ninth capacitor, a second crystal oscillator terminal of the microprocessor is connected with a second end of the second crystal oscillator and a first end of the tenth capacitor, a first data input and output end of the microprocessor is an induction signal input end of the first control module, a second data input and output end of the microprocessor and a first end of the first resistor together form a key signal input end of the first control module, a third data input and output end of the microprocessor is connected with a second end of the first resistor and a first end of the second resistor, a second end of the second resistor and a first end of the twelfth capacitor together form a position detection signal input end of the first control module, a fourth data input and output end of the microprocessor is an indication signal output end of the first control module, a fifth data input and output end, a sixth data input output end and a seventh data input and output end of the microprocessor together form a motor control signal output end of the first control module, a second end of the ninth capacitor, a second end of the tenth capacitor, a second end of the twelfth capacitor and a ground terminal of the microprocessor are connected with a power ground.

* * * * *